Patented June 10, 1930

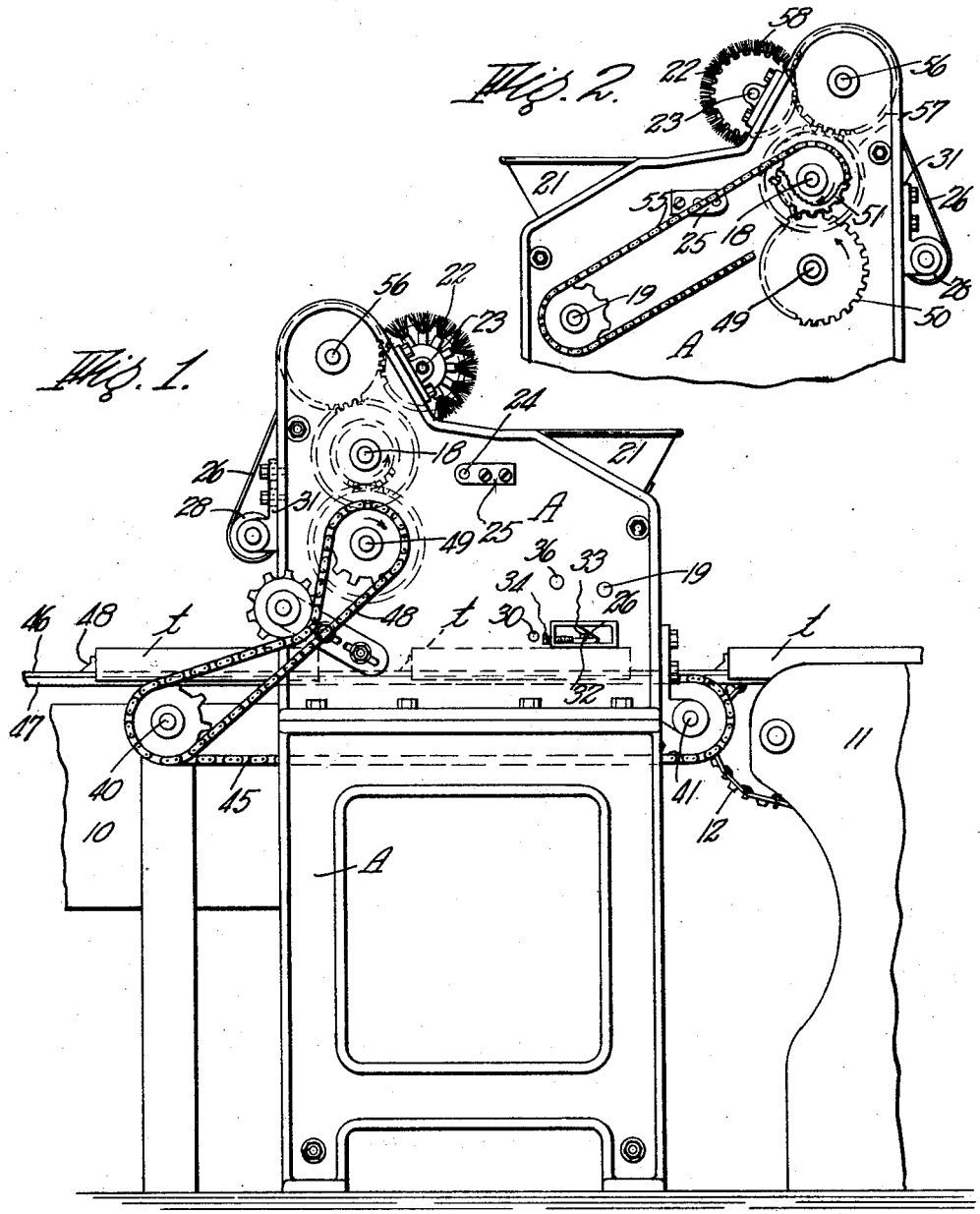

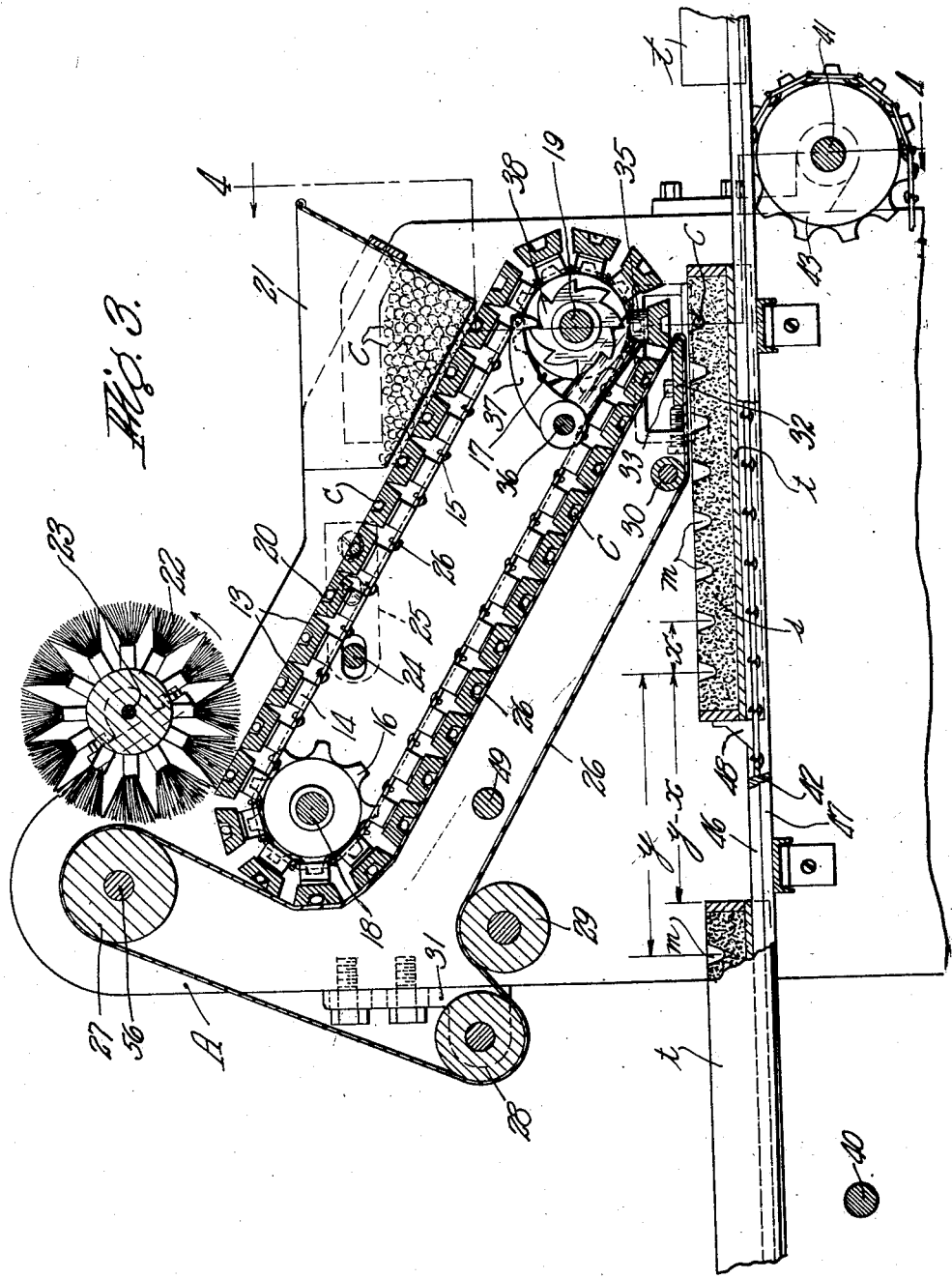

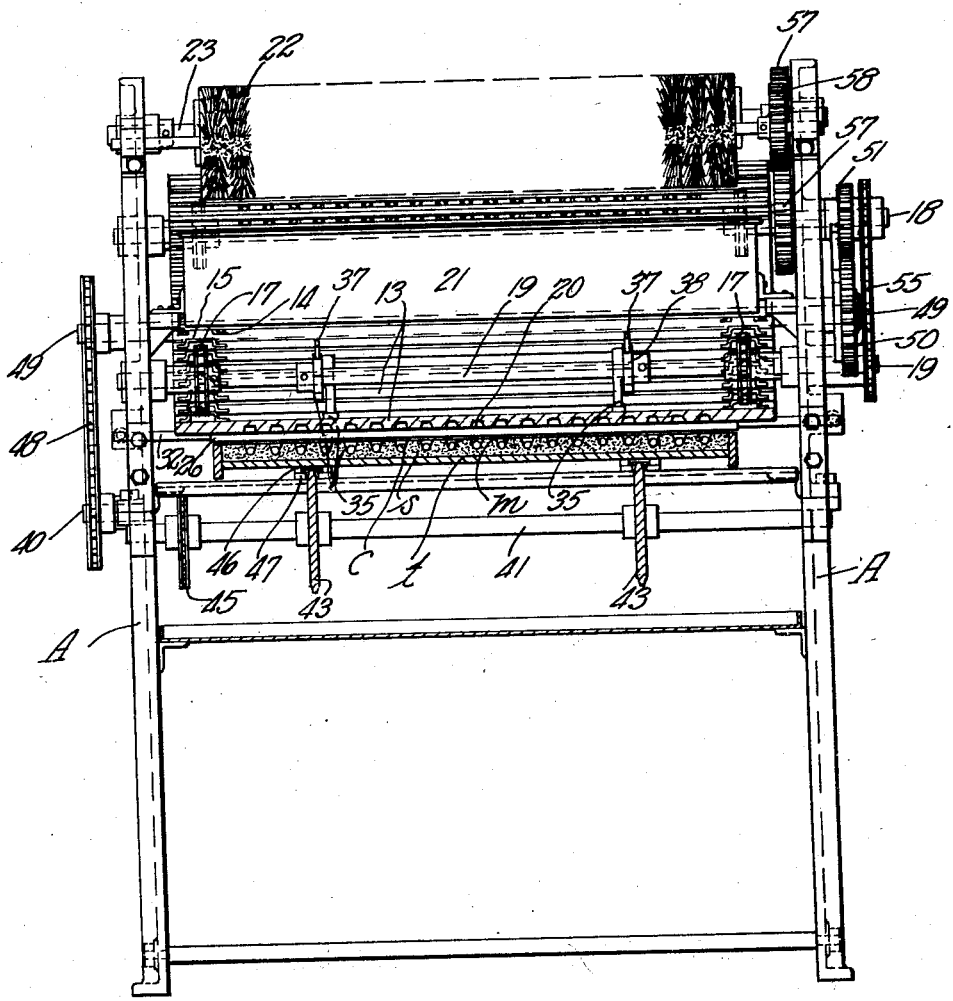

1,763,083

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

FEEDING APPARATUS FOR CONFECTIONERY MACHINES

Application filed July 29, 1926, Serial No. 125,822. Renewed March 13, 1929.

This invention relates to mechanism for feeding articles in rows to a carrier and, more particularly, to the feeding of articles, such as cherries, nuts and the like, which are to be covered with chocolate or other confectionery material.

A problem, frequently encountered and one which is not easy to satisfactorily solve, is to feed the articles into mold recesses, such for example as the mold recesses commonly formed in large numbers in a tray containing starch. Such trays usually contain a number of rows of mold recesses and there are a large number of recesses in each row. Moreover, the recesses are frequently not a great deal larger than the articles which are to be positioned therein. Furthermore, a row of articles must be fed into a row of molds while the mold containing tray is in motion. Accordingly, the article feeding mechanism has to be sure and certain in operation and must be carefully coordinated to work properly in timed relation with the moving tray. The feeding operation is oftentimes still further complicated by the character of the articles to be fed, as for example, in the case of cherries, by their sticky nature.

The invention has for its object the provision of an improved article feeding mechanism which will fulfill these exacting requirements and perform rapidly, surely and accurately the work of feeding articles to molds or other carriers in a commercially satisfactory manner and to perform this work with articles, such as cherries, for example, which are exceedingly difficult to feed with accuracy and certainty.

In carrying out this object, use is made of a conveyer, which has pockets therein spaced transversely to correspond with the spacing of the molds in the starch tray and spaced longitudinally proportionately to the longitudinal spacing of said molds which conveyer is driven accurately in coordinated relation therewith. Means are provided for filling the open pockets in the conveyer during its upper stretch of travel while the pockets are travelling open end up, and associated with such means are provisions which are designed to insure that each pocket is filled with one, and no more than one, of the articles to be fed. The conveyer at one point in its lower stretch of travel, and while the pockets are travelling open end down, is brought very close to and in overlying relation with the starch tray and at such point a row of filled pockets exactly overlies a row of molds in the starch tray. An endless belt, moving at the same surface speed as the conveyer, tightly hugs the same and closes the rows of filled pockets therein during its lower stretch of travel and until the rows of pockets successively arrive at discharging position, when it makes an abrupt turn to quickly, sharply and accurately uncover the pockets allowing the articles to fall, aided when necessary by a rapper, into the molds therebelow. The articles are not released until they are brought as closely as possible to the molds, so that the height of the fall will be at a minimum, and they are also not released until they reach a position so that they cannot fall in any but a true vertical path, whereby it is known with certainty that the articles will surely lodge in the small underlying molds.

Other features of the invention will appear from the following description and will be pointed out in the appended claims.

The invention will be disclosed with reference to the accompanying drawings, in which:—

Fig. 1 is a front elevational view of an apparatus embodying the invention shown as interposed between a mold-forming apparatus and mold-filling apparatus;

Fig. 2 is a fragmentary rear elevational view thereof;

Fig. 3 is a sectional elevational view thereof drawn to a larger scale; and

Fig. 4 is a cross sectional view taken on the line 4—4 of Fig. 3.

Referring to these drawings and particularly to Fig. 3, the apparatus as illustrated is adapted to feed articles, such as cherries $c$ for example, to confection molds $m$. A number of rows of such molds are commonly formed in a body of starch $s$, which is contained in a tray *t*, by suitable mold forming mechanism in an apparatus, such for example as that shown in the Carlson Patent No. 648,353, dated April 24, 1900, and the delivery end of the Carlson apparatus is indicated conventionally in Fig. 1 at 10. The trays *t* are moved in a straight line and substantially horizontal path and usually intermittently by steps equal to the length of the tray plus the length of the space between adjacent trays. The trays ordinarily are delivered from the Carlson apparatus to a depositor, a fragment of which is conventionally indicated in Fig. 1 at 11. The depositor has a tray feeding conveyor 12 which takes hold and drives a tray *t* delivered from the Carlson apparatus and usually moves it intermittently by smaller steps equal to the longitudinal spacing between successive molds *m*. In the depositor 11, the rows of molds *m* are successively filled with suitable confectionery material.

The apparatus of this invention, as illustrated, is adapted to be interposed between an apparatus, such as that of the Carlson patent or its equivalent, and a depositor, whereby the cherries *c*, or any other suitable articles, are fed to molds *m* prior to the depositing of the confectionery material therein. The invention, however, is not limited to this specific location of the article feeding mechanism, which may equally well be interposed between, and used in conjunction with, various other machines known in the confectionery trade. Neither is the invention restricted to particular manner herein described for driving the trays for the article feeding mechanism can readily be coordinated with any form of mold driving mechanism, whatever that may be.

The article feeding mechanism includes a conveyer made up of a series of transverse slats 13, which may be of wood or any other suitable material. These slats are secured to special lugs 14 formed on links 15 of a familiar type of sprocket chain. A pair of these chains are used, each being trained over upper and lower sprockets 16 and 17, respectively. The pair of sprockets 16 is supported by but free to turn on shaft 18 and the pair of sprockets 17 are secured to shaft 19. These shafts 18 and 19 are rotatably supported near their ends in a pair of laterally spaced side frames A, which serve also to support all other parts of the article feeding mechanism. The slats 13, when travelling in a straight line path, lie in abutting relation, or substantially so, and each is provided with a transverse row of article-receiving pockets 20, which are spaced to correspond with the tranverse spacing of the confection molds *m*. The several rows of pockets 20 are, or may be, also spaced longitudinally to correspond with the longitudinal spacing *x* of the rows of confection molds *m*. Where the pocketed conveyor moves at a different speed than the tray conveyer, the longitudinal spacing of the pockets would be different than but proportionate to the longitudinal spacing of molds *m* due to the difference in speed.

The conveyor described is arranged to travel at a surface speed which is preferably, although not necessarily, equal to that of trays *t* and otherwise in a generally corresponding manner. At one point in the travel of this conveyer a row of pockets 20 is positioned upside down and exactly over a confection mold *m*. At this time, the cherries *c*, contained in such row of pockets are released and allowed to drop into the underlying row of molds *m*, being assisted, if necessary or desired, by other means to be described. This conveyor at another point, and in its upper stretch of travel, is arranged to pass beneath a hopper 21, (suitably supported as indicated in Figs. 3 and 4 from frames *f*) which contains a supply of the cherries, or other articles, whereby the pockets 20 are filled. The upper stretch of travel is preferably upwardly inclined, to deter the cherries, other than those in pockets 20, from travelling to an uncontrolled extent with the conveyer and also to facilitate the return of any excess cherries to the supply hopper.

To guard against the possibility of an extra cherry becoming partially lodged in a pocket 20, which already contains one cherry, a brush 22, mounted on a shaft 23 rotatably supported near its ends in frames A, is arranged to travel in the illustrated direction and preferably at a somewhat greater surface speed than the conveyer and sweep back such extra cherries and prevent more than one cherry from being carried in each pocket 20.

For similar reasons, and as an additional safeguard, it is desirable, although not necessarily essential for all purposes, to agitate the conveyer in its upper stretch. This agitation may be effected in a simple manner by means of a shaft 24 supported at its ends in brackets 25, which are mounted for adjustment one on each frame A. This shaft lies adjacent the path of travel of links 15 and, by adjusting the brackets, can be moved closer to or farther away from the same. The protuberances 26 on links 15 engage shaft 24 and ride up and over the same, imparting a rap to the slats, the force of which can be varied by the adjustment described. The agitation of the slats also assists by jarring loose any cherries which may, due to their sticky nature, cling to the outer surfaces of slats 13 and by agitating them so that they travel in irregular paths in their return to hopper 21 and thereby aid in filling empty pockets which may perchance occasionally pass the hopper without being filled.

The pockets in slats 13, having been thus filled, it becomes necessary to close such pockets during those portions of travel in which the pockets are travelling open end down and in which the cherries might otherwise drop out. This is effected by a belt 26, which may be of canvas or any other suitable material and which tightly hugs the slats, during the desired portion of their travel. The belt 26 is trained around a driving roll 27, a tension roll 28, and idler rolls 29 and 30, all of which rolls are rotatably supported near their ends from frames A. Roll 28 is mounted in brackets 31 which are adjustably secured, as by the bolt and slot connection indicated, to frame A. Belt 26 is also trained around the thin edge of a bar 32, which extends transversely across between frames A and is adjustably secured thereto by bolts 33 and can be moved, when bolts 33 are loosened, by adjusting screws 34, mounted one in each frame A. Belt 26, in passing from roll 27 to bar 32, bends around the slats 13 as they pass downwardly around sprockets 16 and then follows these slats, as they move in a straight line path, until bar 32 is reached. The belt is thus made to hug the outer surfaces of slats 13 and close the pockets 20 therein, suitable tension being effected by adjustment of brackets 31. The bar 32 forces the belt 26, when it leaves pocket-closing relation with slats 13, to turn an exceedingly sharp corner and thereby effect a quick, sharp opening of the pockets 20. The thin edge of bar 32 is so adjusted by screws 34 as to open the row of pockets 20 in a slat 13 and release the cherries contained therein at exactly the time when this row of pockets directly overlies and is in perfect alinement with the row of confection molds $m$. The belt 26, travelling in the same direction and at the same surface speed as slats 13, holds the pockets 20 closed without any relative movement which might cause rubbing and abrasion of the cherries in the pockets.

To insure that the cherries fall from the pockets when the same are opened as described, a pair of rappers 35 are arranged to tap the inner face of each slat as it successively arrives at a position such that its pockets are opened. These rappers are mounted to freely turn on a shaft 36, supported at its ends in frames A, and fixed thereto are pawls 37, which are raised and then allowed to fall by ratchets 38, fixed to shaft 19 and turning with and when the slat conveyer drive roll 17 turns. During one revolution of sprockets 17, eight slats 13 will successively be brought into cherry discharging position. Accordingly, ratchets 38 have eight teeth so that in the interval while a slat is moving one step into cherry discharging position the pawls 37 are raised and so that the latter are sharply released and the rappers 36 allowed to fall against the slat at the end of said interval as the slat comes exactly into discharging position.

Referring now to the mechanism for propelling trays $t$, 40 is the shaft which ordinarily drives the tray moving conveyer of the Carlson apparatus. This conveyer, as shown, is lengthened out to carry the trays through the article feeding mechanism although a separate conveyer coordinated with the usual tray conveyer might equally well be used. Accordingly, a shaft 41 is mounted at its ends in frames A adjacent the depositor and the pair of tray conveying chains 42 (Fig. 3) are trained over sprockets 43 fixed thereon. Shaft 41 is driven from shaft 40 by a chain 45 and suitable sprockets shown in Fig. 1. The trays $t$ slide on two pairs of runways 46 (suitably supported as indicated in Figs. 3 and 4 from frames A) and the chains 42 ride at their edges along pairs of runways 47. The chains carry lugs 48 to engage trays $t$ and these chains are moved by one revolution of shaft 40 far enough to move the tray a distance equal to its length plus the length of the space between it and the next succeeding tray. These chains carry the tray sufficiently close to the depositor 11 so that it can be picked up and moved by the propelling chains 12 thereof. The shaft 40, in the form of the invention disclosed turns one revolution and then dwells while other mechanisms, such for example as that by which molds $m$ are formed, are functioning.

All parts of the article feeding mechanism are driven from shaft 40 and thereby proportionately and in coordinated relation with the trays $t$, with the exception that said parts have an interval of rest so that no cherries are deposited in the space between adjacent trays. Shaft 40 is connected by a chain 48 and suitable sprockets to a shaft 49 which is mounted near its ends in frames A and at its rear end carries an intermittent gear 50 during a portion of one revolution drives a gear 51 fixed to the rear end of shaft 18 and during the remaining portion of the revolution turns idly without moving gear 51. Shaft 18 is connected by a chain 55 and suitable sprockets (Fig. 2) to shaft 19 which drives the slat conveyer so that the idle and working periods of gear 51 cause similar idle and working periods of the slat conveyer. If $x$ equals the spacing between the several rows of molds $m$ in one tray and $y$ the spacing between the end row of molds in one tray and the adjacent end row of molds in a succeeding tray, then the tray moves continuously a distance equal to $7x$ plus $y$ and comes to rest. During a portion of this interval of tray movement equal to 8x, gear 50 turns gear 51 to operate the slat conveyer and then during an interval of tray movement, equal to y minus x, gear 50 turns without causing movement of the slat conveyer. As shown, the slat conveyer has made one increment of movement from its interval of rest and will make seven more like increments of movement until the eight rows of molds m have been filled. Then it will come to rest while the tray moves the distance y—x, when the tray comes to rest. As soon as the tray is again moved, the cherry feeding conveyer moves with it so that a slat 13 filled with cherries will move into position over the first row of molds m in a succeeding tray, as that tray moves the distance x.

The other moving parts of the article feeding mechanism are driven from shaft 18 in the following manner. Shaft 19, which carries the ratchets 38 for operating the rappers 35, is driven from shaft 18 by a chain 55, as described. The shaft 56, carrying the drive roll 27 for belt 26, is connected by spur gears 57 to shaft 18 to turn therewith and at equal speed. The shaft 23 of brush 22 carries a gear 58 which meshes with the upper gear 57.

It is not at all essential that the trays t be moved in the exact manner described and such manner of tray movement is merely illustrative of the usual condition prevailing in the apparatus 10. Where the cherry feeder is applied at other locations or with other machines, a different manner of tray movement may readily be used. The important thing is to coordinate the movement of the cherry feeding conveyer with the movement of the tray, whatever that may be.

For trays, having a greater or less number of rows of molds, other sets of gears are furnished to be substituted for the set of gears 50 and 51.

In operation, the cherry feeding conveyer starts to move as soon as the trays start to move and, as soon as tray t has moved a distance x, a previously filled slat 13 will have been positioned so that the center lines of its row of pockets coincide with the center lines of the molds m in the first row in tray t, at which time the belt 26 uncovers said row of pockets allowing the cherries to drop into the molds. The tray and feeder move continuously until the succeeding rows of molds m are filled, after which the cherry feeder comes to rest while the tray continues to move the distance y—x, when the tray comes to rest.

During the operation of depositing cherries in molds m, certain of the slats 13 are moving upwardly in under hopper 21 and the pockets 20 therein are becoming filled with cherries. The latter often tend to cling to the slats and some of them travel therewith for a distance, eventually rolling back due to the steeply inclined path of the slats, or being jarred loose by the rapping action due to links 15 riding over shaft 24, or being swept back by brush 22. Occasionally, some of the cherries thus rolling back fill unoccupied pockets 20. It is important to permit a certain amount of cherries to travel with slats 12 and to allow them to roll back for this reason. Hence the hopper 21 is left open at its forward end and the slats are made to travel up an inclined path so that the cherries will roll back. The incline chosen is such as to allow a controlled amount of cherries to travel with the slats a short distance, say almost up to rapper shaft 24. By leaving the hopper open, as described, there is no chance of cherries, which may be only partially lodged in pockets 20, being crushed or abraded as they would be if a rigid front wall were used.

The rapping action due to shaft 24 is desirable but not necessarily essential in all cases. So also with the brush, only this is rather more desirable than the rapping action. Whether these elements are used or not depends on the character of the articles being fed. Round nuts, for example, could very likely be successfully handled without the rapping action due to shaft 24 or that due to rappers 35 for the nuts are hard and dry and roll freely, whereas cherries are softer and sticky and tend to cling to the slats and to the walls of pockets 20.

A most important feature of the invention is that each row of pockets 20 once closed, are held positively closed until they become exactly alined with a row of molds m. Then, when the pockets are opened, the articles have only a very short distance to fall and the path of fall is truly vertical. There is, thus, no chance for the article to leave its pocket ahead of time and to fall in irregular, uncertain and uncontrolled paths. The articles are released with precision at exactly the right time and at a time when they are not permitted to fall otherwise than in a vertical path and at a time when they have been brought so close to the overlying molds that the drop is short and there is little if any chance of their moving in any but the exact paths intended. To further secure accuracy in the positioning of the rows of cherry-filled recesses, shaft 19 is made the driving shaft so that the slats are pulled rather than pushed into discharging position.

The invention has been disclosed herein, in an embodiment at present preferred, for illustrative purposes, but the scope of the invention is defined by the appended claims rather than by the foregoing description.

What I claim is:

1. Mechanism for feeding rows of articles to rows of molds, comprising, a travelling carrier for the molds on which the molds are arranged in transverse rows spaced longitudinally from each other, a conveyer mounted to move during part of its lower course of travel in a path above the path of travel of said molds, said conveyer having in its outer face a series of longitudinally spaced transverse rows of article receiving pockets into which the articles are placed while the pockets are travelling open end up, a belt mounted to move in part of its course of travel in contiguous relation with the outer face of said conveyer for the purpose of closing the rows of pockets therein after the same have been filled and holding them closed until the rows successively arrive at a predetermined point in said first named path when the belt moves away from the conveyer to successively open the rows of pockets and allow the rows of articles to successively fall, and means for coordinating the movement of said conveyer and mold carrier so that as each row of pockets arrives at said point a row of molds lies under the pockets to receive the falling articles.

2. Feeding mechanism, comprising, a travelling carrier for molds, a conveyer mounted above said carrier so that in its upper course it moves in an upwardly sloping path away from the carrier and in its lower course moves downwardly toward the carrier and at one point in said course overlies the path of travel of said molds, said conveyer having article-receiving pockets in its outer face, an open-bottomed hopper containing the articles to be fed and under which the conveyer near the start of its upper course travels in closely adjacent relation to close the bottom thereof, whereby the pockets become filled with articles, a belt which in part of its course of travel moves at the same surface speed and in the same direction as said conveyer and in contiguous relation therewith while the conveyer is travelling in its lower course for the purpose of closing the filled pockets and holding them closed until they successively arrive at said point, and coordinated means for driving said carrier and conveyer so that as each pocket successively arrives at said point a mold underlies it to receive the article therein.

3. Feeding mechanism, comprising, a travelling carrier for molds, a conveyor mounted above said carrier so that in its upper course it moves in an upwardly sloping path away from the carrier and in its lower course moves downwardly toward the carrier and at one point in said course overlies the path of travel of said molds, said conveyer having article-receiving pockets in its outer face, an open-bottomed hopper containing the articles to be fed and under which the conveyer near the start of its upper course travels in closely adjacent relation to close the bottom thereof, whereby the pockets become filled with articles, means for closing the filled pockets and holding them closed until they successively arrive at said point, coordinated means for driving said carrier and conveyer so that as each pocket successively arrives at said point a mold underlies it to receive the article therein, and means for agitating the conveyer during its upper course of travel.

4. Feeding mechanism, comprising, a travelling carrier for molds, a conveyer mounted above said carrier so that in its upper course it moves in an upwardly sloping path away from the carrier and in its lower course moves downwardly toward the carrier and at one point in said course overlies the path of travel of said molds, said conveyer having article-receiving pockets in its outer face, an open-bottomed hopper containing the articles to be fed and under which the conveyer near the start of its upper course travels in closely adjacent relation to close the bottom thereof, whereby the pockets become filled with articles, means for closing the filled pockets and holding them closed until they successively arrive at said point, coordinated means for driving said carrier and conveyer so that as each pocket successively arrives at said point a mold underlies it to receive the article therein, and means for rapping said conveyer at and as each pocket successively arrives at said point.

5. Feeding mechanism, comprising, a travelling carrier for molds, a conveyer mounted above said carrier so that in its upper course it moves in an upwardly sloping path away from the carrier and in its lower course moves downwardly toward the carrier and at one point in said course overlies the path of travel of said molds, said conveyer having article-receiving pockets in its outer face, an open-bottomed hopper containing the articles to be fed and under which the conveyer near the start of its upper course travels in closely adjacent relation to close the bottom thereof, whereby the pockets become filled with articles, a belt which in part of its course of travel moves at the same surface speed and in the same direction as said conveyer and in contiguous relation therewith while the conveyer is traveling in its lower course to close the filled pockets and hold them closed until they successively arrive at said point, coordinated means for driving said carrier and conveyer so that as each pocket successively arrives at said point a mold underlies it to receive the article therein, and means tending to prevent more than one article from lodging in each pocket.

6. Mechanism for feeding articles to molds, comprising, a traveling carrier for a series of molds arranged in longitudinally spaced relation, a conveyer mounted to move during part of its lower course of travel in a path above and adjacent to the path of travel of said molds, said conveyer having a series of longitudinally spaced pockets in its outer face into which pockets the articles are fed during that course of travel of said conveyer where the pockets are traveling open end up, means for successively closing the pockets after the same have been filled to retain the articles therein, said means holding the pockets closed until they successively arrive at a predetermined point in said path and then opening them, means for rapping the pockets as they successively arrive at said point and are opened to release the article therein, and means for coordinating the movement of said mold carrier and conveyer so that as each pocket is opened to release the article therein a mold lies under the pocket to receive the released article as it falls.

7. Mechanism for feeding articles such as cherries or the like, comprising, a conveyer having article receiving pockets in its outer face and mounted so that in its upper course it moves in an upwardly sloping path, an open-bottomed hopper containing the articles to be fed and under which the conveyer near the start of its upper course travels in closely adjacent relation to close the bottom thereof, whereby the pockets become filled with articles, and a belt moving at substantially the same surface speed as said conveyer and in part of its course of travelling in contiguous relation therewith for the purpose of closing said pockets after they have been filled and holding them closed without rubbing or abrading the articles while the pockets are travelling open end down until they successively arrive at a predetermined point in the lower course of travel of said conveyer when the belt moves away from the latter and allows the articles to drop from said pockets.

In testimony whereof I have affixed my signature.

ALONZO LINTON BAUSMAN.